United States Patent [19]

Paoletti

[11] Patent Number: 5,045,856
[45] Date of Patent: Sep. 3, 1991

[54] VEHICULAR ANTICOLLISION RADAR SYSTEM FOR DRIVING IN THE FOG

[76] Inventor: Paolo A. Paoletti, No. 62, Via Luigi Rizzo, 00136 Roma, Italy

[21] Appl. No.: 474,812

[22] PCT Filed: Jan. 16, 1989

[86] PCT No.: PCT/IT89/00002

§ 371 Date: Jun. 29, 1990

§ 102(e) Date: Jun. 29, 1990

[87] PCT Pub. No.: WO89/06808

PCT Pub. Date: Jul. 27, 1989

[30] Foreign Application Priority Data

Jan. 18, 1988 [IT] Italy ............ 47545 A/88

[51] Int. Cl.$^5$ ............ G01S 13/93; G01S 13/48
[52] U.S. Cl. ............ 342/70; 342/129; 342/146; 342/176; 367/111; 367/909; 340/904
[58] Field of Search ............ 342/70, 146, 176, 129; 367/111, 909; 340/904

[56] References Cited

U.S. PATENT DOCUMENTS

| | | | |
|---|---|---|---|
| 3,659,293 | 4/1972 | Gupta | 342/129 X |
| 3,855,594 | 12/1974 | Botcherby | 342/129 X |
| 4,349,823 | 9/1982 | Tagami et al. | 342/70 |
| 4,467,313 | 8/1984 | Yoshino et al. | 367/909 X |
| 4,674,073 | 6/1987 | Naruse | 367/909 X |

FOREIGN PATENT DOCUMENTS 0257381 12/1985 Japan .
0210684 9/1988 Japan ............ 367/111
80/01782 9/1980 PCT Int'l Appl. .

OTHER PUBLICATIONS

Mayhan et al., "A Two-Frequency Radar for Vehicle Automatic Lateral Control"; IEEE Trans. on Vehicular Tech., vol. VT-31; No. 1, Feb. 82, pp. 32-39.
Merlo, "Automotive Radar for the Prevention of Collisions"; IEEE Trans. on IECI; vol. IECI-11, No. 1, Feb. 64.

Primary Examiner—Gilberto Barrón, Jr.
Attorney, Agent, or Firm—Roylance, Abrams, Berdo & Goodman

[57] ABSTRACT

The space ahead of a moving vehicle is irradiated in sectors (A–G) by a plurality of CW solid state radar devices mounted as an array across the front of the vehicle, such that adjacent lobes of each beam may overlap. The radar signal comprises a CW beam modulated intermittently by a slightly offset frequency to produce 'pulses' which when reflected from obstacles within respective sectors (A–G) are detected by mixer diodes in one, or two adjacent radar devices after a time delay which, measured, yields a distance to the obstacle. Obstacles so detected may be displayed in two dimensions within their respective sector (A–G) on a display projected onto the windscreen.

7 Claims, 2 Drawing Sheets

VEHICULAR ANTICOLLISION RADAR SYSTEM FOR DRIVING IN THE FOG

To drive a vehicle in the fog with scarce visibility, it is not sufficient that only the presence of obstacle or free way before the vehicle be indicated or displayed, not even if such indication is completed with information as to the minimum distance between the obstacles and the vehicle. It is necessary to know their location with as much detail as possible, so as to take proper decisions in respect of the maneuvers to perform, particularly in proximity to right hand or left hand curves or when a preceding too slow vehicle is to be overtaken.

It is an object of this invention to supply the driver of the vehicle with such additional information. This object is achieved by detailedly displaying the whole geometry of the plan space in front of the vehicle by means of a bidimensional illuminated dial consisting for instance of a matrix or array of luminous spots or cells arranged in rows and columns that simulate the plan space in front of the vehicle and to give a symbolic representation of any obstacle by emitting for instance red or green light when an obstacle is present or it is not present, respectively, in front of the vehicle. Such a dial could be arranged in the dashboard of the vehicle; it could also be of the so-called head-up display kind in which a luminous image of the dial is projected onto the windscreen so as to enable the driver to look at it while he attempts to look at the road.

In other words, the problem s to measure the coordinates of an obstacle. We shall use polar coordinates. Referring to FIG. 3, under the term distance (between the vehicle and the obstacle) the length of the radial vector $R=OH$ is meant and, under the term declination, the angle Z formed between the radial vector R and the vertical axis y is meant.

The length of R can be derived from the measure of the time t required by an electromagnetic radiation to propagate from the antenna located in 0 to the obstacle H and to return back to 0 upon reflection from the obstacle H. Assuming that the propagation velocity is c, we get $$R = c \cdot t/2.$$

If an obstacle placed at a distance R and at an angle Z is to be revealed, we may use n microwave slightly divergent beams irradiated by small stationary antennas, so as to enable to explore $2n-1$ area sectors, as shown for instance in FIG. 2, where $n=3$. In FIG. 2, five angular sectors can be distinguished for an approximate evaluation of angle Z: in fact, it can be observed in FIG. 2 that if an obstacle is located for instance in the center line of sector B, it will be detected only by the beam B; if it is located at an intermediate position, for instance, in overlap sector $A+B$, it will be deflected both by beam A and by beam B.

Even if this operation way, that can be defined as an "amplitude discrimination", appears to be analogous to a monopulse radar operation way as already adopted in automatic tracking systems, in effect it is quite different. In fact, such already used systems are effective when there is one only target to be detected, but they become less efficient when the targets to be detected are more than one, especially when such targets are equidistant from the radar and are clustered.

It is therefore an object of this invention to detect and indicate any and each obstacle existing in front of a vehicle, with a satisfactory accuracy for most practical obstacle patterns.

The most difficult obstacle patterns to be accurately detected and indicated are those having multiple obstacles, all aligned at the same distance R from the antennas; also in this circumstance it is the aim of this invention to supply sufficient information for safely driving the vehicle, only with the exception of some very particular cases, that, anyway, do not reduce the overall safety offered by this system.

The principles upon which this invention is based are as follows. Let us suppose, for simplicity sake, $n=3$, as in FIG. 2: the three beams belong to the three antennas A, B and C, that can operate both as transmitting and as receiving antennas and are connected, therefore, to respective transmitters and receivers. Individual short radio frequency pulses are emitted in turn by each of the three transmitters, while the three receivers are always contemporaneously operative. Individual pulses are therefore successively emitted in turn by antenna A, by antenna B and by antenna C. Let us suppose now that there is one only obstacle entirely situated in sector A (refer to FIG. 2) at a distance R from antenna A. The pulse emitted by antenna A in sector A is reflected by the obstacle and an echo signal due to this reflection s received after a certain time delay by antenna A. The pulses subsequently emitted by antennas B and C do not encounter any obstacle and, therefore, no echo signal is received by antennas B and C. If the obstacle is situated in overlap sector $A+B$, the pulses successively emitted by antennas A and B are reflected and echo signals are received by both antennas A and B; the pulse emitted by antenna C is not reflected and no echo signal is received therein. Analogous situations apply for obstacles situated in sector B or $B+C$ or C.

It should be understood that two and even three discrete aligned obstacles situated at the same distance R from the antennas and included the first one in sector A, the second one in sector B and the third one, if any, in sector C—without affecting overlap sectors $A+B$ and $B+C$—can be distinctively detected by the apparatus; in fact, in this case, the system receives at a first time an echo signal only in antenna A, at a second time an echo signal only in antenna B and at a third time an echo signal only in antenna C. Furthermore, in this case, echo signals are never received contemporaneously in antennas A and B or antennas B and C.

Only by way of explanation, it can be added that echo signals can be simultaneously received, for geometrical considerations, only when an obstacle is situated in one of the overlap or common sectors, for instance, in sector $A+B$ or in sector $B+C$, at a distance R from the antennas. In fact, in this case, a pulse transmitted by antenna A hits the obstacle, is reflected therefrom and echo signals are contemporaneously received by both antennas A and B; also the successive pulse emitted by antenna B encounters the same obstacle, is reflected therefrom and echo signals are contemporaneously received by both antennas B and A.

For the sake of completeness, it is to be remarked that the above situation (obstacle in sector $A+B$ and echos received in both antennas A and B) occurs regardless of the fact whether, in addition to an obstacle in overlap sector $A+B$, other obstacles are present or are not present also in sectors A and/or B at the same distance R. In fact, unless the echo signal are further processed, when both antennas A and B are receiving echo signals, it is not possible to distinguish whether (a) an obstacle is present in overlap sector A+B, (b) discrete obstacles are present in sectors A and B; (c) discrete obstacle are present in sectors A, B and B+C; (d) a big obstacle occupies contemporaneously at least partially both sectors A and B (and of course also the intermediate overlap sector A+B).

To avoid such further processing it is reasonable to assume the worst case wherein discrete obstacles (or a single big obstacle) are (is) present in all sectors A, A+B and B at the same distance R: in this case an indication can be given of a single obstacle at a distance R with a span covering all three sectors A, A+B and B. This choice should not be construed as a imitation of the system, since this invention has the aim to provide an aid for driving a vehicle in the fog and, since this is an extremely dangerous condition, it is better to be a bit more rather than a bit less cautious and to discourage hazardous manoeuvres.

The above set forth explanations can be extended to sectors B+C and C with the same conclusions.

With the described plural receiving-transmitting antenna radar system full angular information is achieved on how to proceed in the fog.

Also for the sake of completeness, it is to be remarked that if desired and if the system is applied to road vehicles, road delimiting guard-rails or other radar detectable surfaces may be displayed on the dial in order to furnish a complete view of the plan space in front of the vehicle. In effect such microwave reflecting surfaces can be conveniently provided for safety driving purposes along the road shoulders or to delimit transit passages, to mark trenches, ravines and like.

When an obstacle is detected, for instance in sector A at a distance R=50 meters, the dial is designed so that not only the spot or cell strictly corresponding to the above parameters of the obstacle is properly illuminated but also all of the spots or cells behind it are illuminated in the dial. This reflects the fact that when an obstacle is present in front of a vehicle, it masks or shadows any item or environment feature included in its shadow cone, as it normally occurs in optics.

Referring to FIG. 1 which shows—on left—a plan view of a car running on a road and provided with a radar system according to the invention wherein n=4 and, on the right, a schematic view of a dial consisting of an array of 7×10 spots or cells, it can be seen that the first radar beam intercepts the left shoulder of the road at a distance of 40 meters, the fourth radar beam intercepts the right shoulder of the road at a distance of 30 meters and the intermediate radar beams intercept the right shoulder of the road at increasing distances. In this situation a road having a bend to the left is displayed.

The design of the apparatus requires three stages: the first stage relates to a broad study of the electromagnetic wave propagation and to the selection of the microwave devices of the n transmitting-receiving sections with the respective antennas. The second stage relates to designing all the circuits required to modulate, amplify and combine or compare the emitted and the received signals, in order to achieve the data needed to compute R and Z. The third stage provides for processing the various data (R and Z) relating not only to a single obstacle, but also to complex obstacle configurations to be shown on the display. In particular, the weak echo signals received by the receivers, after having been suitably amplified, could be evaluated in accordance to the above described criteria by means of dedicated circuitry which may be of digital and high processing speed kind. The effective implementation of these circuits is feasible without difficulties with more or less sophisticated solutions which any person skilled in the art can design having in mind the results to be achieved. No particular implementation is detailed herein, because no particular implementation is subject-matter of this invention.

The processed signals are to be used to drive a bidimensional array display, such as the one shown in FIG. 1. Driving an array or matrix display is known in the art.

Likewise, it appears to be fruitless to deeply explain the circuitry to amplify the weak echo signals received by the receivers because a lot of such circuits are known in the art; same remarks apply to transmitters, antennas and comparators.

Figure 1:
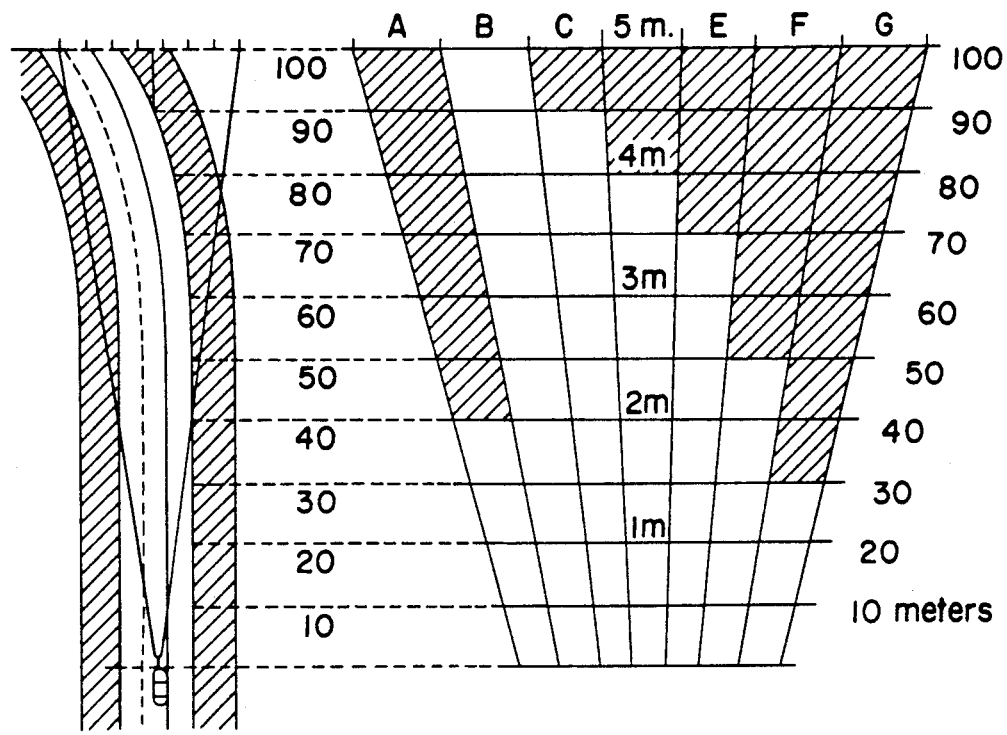
FIG. 1 is a schematic two part view showing on the left side a plan view of a car running on a leftwardly bending road and, on the right side, a display device consisting of a 7×10 array of luminous cells.

Referring now to the drawings, a preferred and basic embodiment of the invention will now be described to confirm the validity of the system. The circuitry is based upon use of three identical resonant cavities (so-called gunnplexer) A, B and C, having for instance an operative frequency of 10 GHz. Such resonant cavities are per sè well known and commercially available. Each of these conventional resonant cavities includes a Gunn and a varactor diode as well as a Schottky diode. Therefore, such resonant cavities are adapted to generate and modulate a radiofrequency signal by means of said Gunn and varactor diodes and to detect echo signals by means of said Schottky diode.

Figure 2:
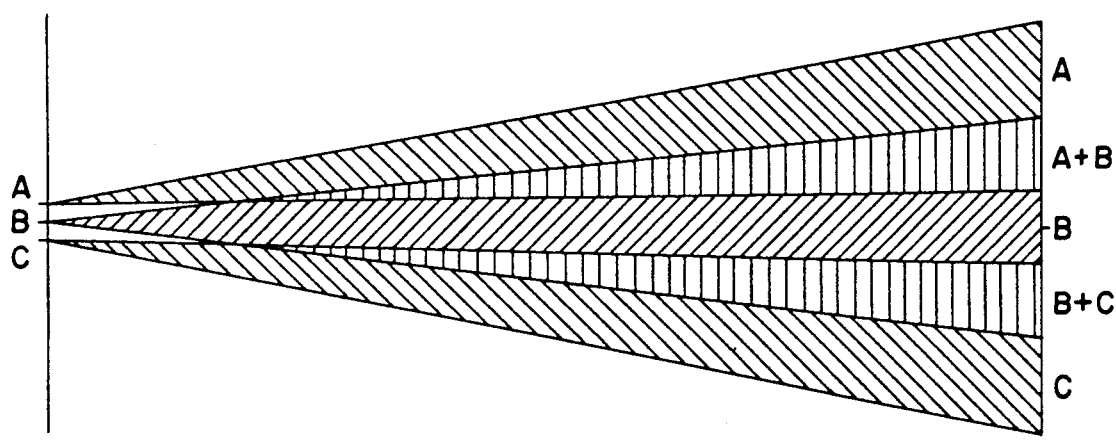
FIG. 2 is a schematic view of the radiation sectors of three transmitting-receiving antennas A, B and C.

Three small and directional horn type or parabolic type antennas are associated to such resonant cavities so as to form three narrow divergent beams, as shown in FIG. 2.

In this invention the resonant cavities gunnplexer A, B and C operate conventionally. Therefore, if a specific supply voltage is applied to each Gunn diode, it generates a radiofrequency oscillating signal in the cavity. The frequency of such oscillating signal also depends on the voltage applied to the varactor diode included in the same cavity. In other words, if a voltage $V_1$ is applied to the varactor diode, the frequency of said oscillating signal is $f_1$; when the voltage applied to the varactor diode becomes $V_2$, then the frequency of the oscillating signal becomes $f_2 = f_1 + f_b$, wherein $f_b$ depends on the voltage difference $V_2 + V_1$.

Figure 6:
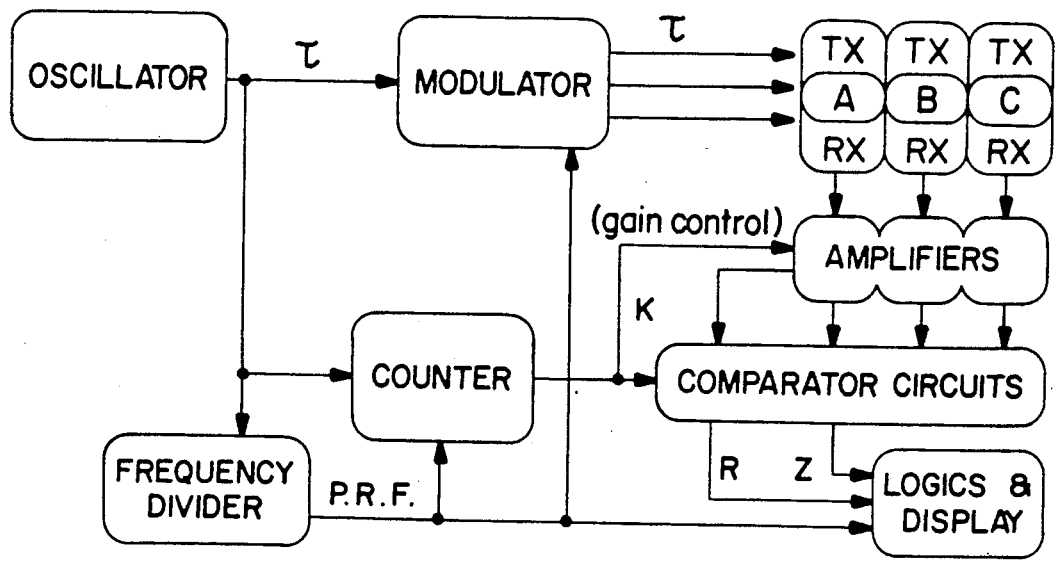
FIG. 6 shows a block diagram of the radar system according to the invention.

As it can be seen in FIG. 6, the apparatus includes an oscillator circuit connected to a modulator circuit. The modulator circuit can be of any kind well known to those skilled in the art. The modulator circuit normally supplies the varactor diodes of the three resonant cavities with a voltage $V_1$, but at regular time intervals T and for a very short time duration $\tau$, it supplies the varactor diodes of the three resonant cavities successively with a voltage $V_2$.

This means that each resonant cavity emits a continuous microwave train normally having a frequency $f_1$, but, at said regular time intervals T and with said very short time duration $\tau$, said microwave train has a frequency $f_2$. Since, as above said a receiving-transmitting antenna is associated to each resonant cavity, a microwave train with frequency $f_2$ is emitted successively from each antenna, it is propagated in normal way in the space in front of the vehicle and, if an obstacle is located at a distance R, it hits the obstacle, is reflected therefrom and returns to the antenna. The time span from the transmission instant to the reception instant is $t=2R/c$, wherein R is said distance and c is the propagation velocity the microwave train. The return or echo signal from the antenna is conveyed to the receiving Schottky diode included in the resonant cavity. In the meantime, the resonant cavity has resumed to oscillate at the normal frequency $f_1$ and a small portion of this oscillating signal is intercepted by said Schottky diode included in the same resonant cavity. This Schottky diode, as it is known to those skilled in the art, performs the product of the two above noted oscillating signals it receives at frequencies $f_2$ and $f_1$. In conclusion, when an obstacle is present in front of a vehicle, a signal of the following kind $$u(t)=r(t).m(t)=A_2\cos(2\pi f_2 t+\phi_2)A_1\cos(2\pi f_1 t+\phi_1)=A\cos 2\pi(f_2+f_1)t+(\phi_2+\phi_1)+A\cos 2\pi(f_2-f_1)t+(\phi_2-\phi_1),$$

wherein
  r(t) is the echo signal and
  m(t) is the portion of the oscillating signal at frequency $f_1$ intercepted by the Schottky diode,
is present at the output pin of said Schottky diode included In the resonant cavity.

The resulting signal u(t) is the so-called beat of the two signals r(t) and m(t) and consists of two components of equal amplitude A: the first component has a frequency $(f_1+f_1)$ the second component has a frequency $(f_2-f_1)$. Since it has been assumed that $f_1 \simeq f_2 \simeq$ 10 GHz, the first component has a frequency of about 20 GHz which is of no interest, so that this component is filtered-out; the second component has a frequency $(f_2-f_1)$ which is of course much lower, so that this component is meaningful and represents the useful signal deriving from the microwaves reflected from the obstacle.

Similar events occur in each resonant cavity of the system. In conclusion, from the measure of the time span t between the instant at which a short oscillation train at a frequency $f_2$ is emitted and the instant at which an oscillating signal at a frequency $f_b$ is outputted from the Schottky diode, the distance can be computed between the concerned resonant cavity and the obstacle, based upon the following equation $R=c.t/2$.

Use of this kind of modulation having the characteristics of a pulse modulation with a pulse duration $\tau$ enables to discriminate the obstacles in depth, or, in other words it enables several obstacles successively farther away from the resonant cavity to be distinguished with a resolution r which is bound to the pulse duration $\tau$ by the equation $r=c.\tau/2$.

The maximum distance (range) $R_{max}$ having interest to detect the obstacles determines the pulse repetition frequency (P.R.F.) or the pulse timing T (T=1/P.R.F.) in accordance to the equation $T_{min}=R_{max}/c$. When disadvantageous echo signal superpositions or overlaps (second-time-around echos) are to be avoided. It is necessary to use T values at least twice as great as $T_{min}$. Thus, for instance, when a range $R_{max}$ 100 meters is selected (whereby $T_{min}=0,67$ microseconds), the T value to be used is 2 microseconds.

Figure 4:
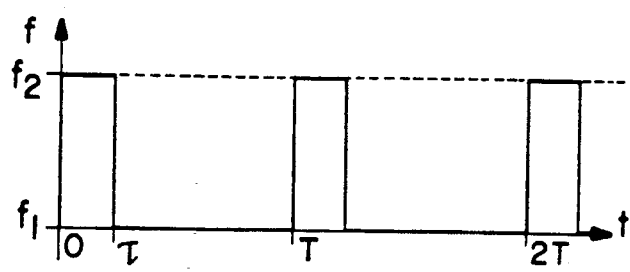
FIG. 4 shows a square wave form alternating with a period T between a frequency $f_2$ for a duration $\tau$ and a frequency $f_1$ for a duration $T-\tau$.

FIG. 4, which is not drawn to scale, only qualitatively indicates the relationship between $f_1$, $f_2$, $\tau$, T.

In FIG. 1 the maximum range $R_{max}=100$ meters has been subdivided in ten segments each of 10 meter length. This subdivision can been selected because it has been found to be sufficient to recognize the zones free from obstacles at various distances in front of the vehicle. To assure the capability to discriminate obstacles spaced from one another in the direction of R of at least ten meters a distance resolution r=10 meters is required: this means that a pulse duration no longer than $\tau=67$ nanoseconds is necessary.

Summarizing and referring to FIG. 6, the preferred embodiment of the apparatus of this invention substantially includes simple and per se well known circuits namely an oscillator, a modulator, a frequency divider, a counter, three resonant cavities provided with Gunn diodes, varactor diodes and Schottky diodes and having transmitting-receiving horn antennas associated therewith, amplifier and comparator circuits as well as a logic and display circuitry.

As above outlined the operation of the whole apparatus is as follows. The circuit generates a square wave signal with a period $\tau$ (preferably $\tau$ can be selected $\tau=67$ nsec); this signal is applied to a modulator circuit, to a counter circuit and to a frequency divider circuit. The divider circuit furnishes an output square wave signal having a period T. The modulator circuit receives then a square wave signal with period $\tau$ from the oscillator and a square wave signal with period T from the frequency divider. The modulator circuit is connected to the three resonant cavities A, B and C and in particular to the varactor diodes included therein. This means that the modulator circuit normally supplies the three varactor diodes with a voltage $V_1$ but at time intervals of T sec it generates for a duration $\tau$ a voltage $V_2$ that is applied by means of a well known multiplexing circuitry to said three varactor diodes one by one successively: in this manner the three resonant cavities normally emit a microwave train at a frequency $f_1$ but at intervals of T seconds and for a duration of $\tau$ seconds each resonant cavity in turn emits a microwave train at a frequency $f_2$.

The microwave trains upon reflection from the obstacles, if any, are received by one or more antennas, according to the remarks already set forth in respect of FIG. 2, and reach the respective Schottky diodes as weak signals having a duration $\tau$. The output signals from said Schottky diodes are applied to three respective amplifier circuits, as shown in FIG. 6 by a three lobe amplifier block.

Figure 3:
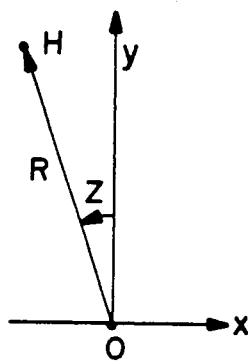
FIG. 3 is a polar representation superimposed to an x-y representation of an obstacle H situated at a distance R and angularly displaced of angle Z (formed with axis y) with respect to a vehicle situated in 0.

The measure of R (FIG. 3), namely the distance between the antenna and the obstacle, is computed based upon the above set forth formula $R=c.t/2$ by measuring the time t between the instant at which a microwave train is emitted at a frequency f and the instant at which the reflected echo signal is revealed by the Schottky diodes.

This measurement can be easily carried out by means of said counter circuit driven by the oscillator circuit. In fact, assuming that the count k of the counter is zero at the instant at which the microwave train at a frequency $f_2$ is emitted, in the count k reached when the echo signal is revealed by said Schottky diode represents the time needed by the microwave train to reach the obstacle and to return therefrom to the Schottky diode. In other words it represents the distance of the obstacle from the antenna: more precisely it represents a distance which is twice the effective distance.

The combination of the count k with the echo signals in order to obtain such a distance signal R is carried out by means of comparator circuits the inputs of which are connected to said amplifier circuit on one hand and to said counter circuit on the other hand.

In the assumed condition that a distance resolution of ten meters is selected, the oscillator circuit has a period $\tau = 67$ nsec and the count k of the counter is incremented at a rate of 1 unit each 67 nanoseconds. This time, in fact, is the time needed by the electromagnetic radiation to reach an obstacle at a distance of 10 meters and to return to the antenna (total go-and-return distance = 20 meters).

As above said, the counter is to be reset to zero at the same instant at which the microwave train at a frequency $f_2$ is emitted. This function is carried out by applying to the counter the same P.R.F. signal which is applied to the modulator circuit to generate the voltage $V_2$ which is used to drive the varactor diodes of the resonant cavities.

Figure 5:
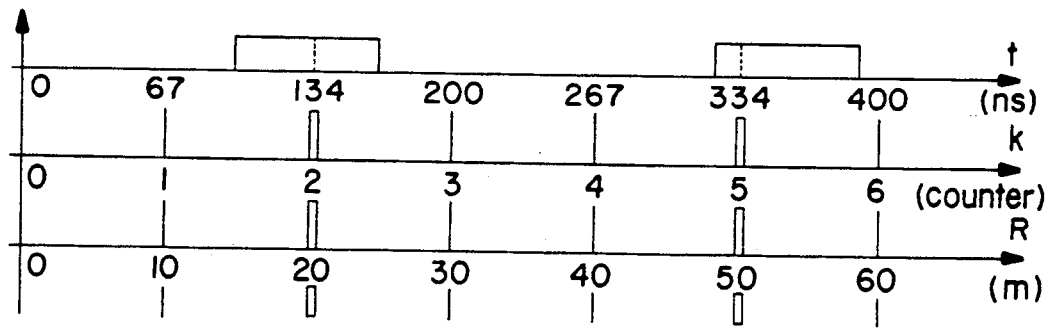
FIG. 5 shows the time relationship between the time t, the count k of a counter and the distance signal R when two obstacles at 20 and 50 meter distances are detected.

FIG. 5 clearly shows how the presence of two obstacles at distances of 20 and 50 meters, respectively, can be located: in the output of one of the amplifier circuits is shown on axis t; the output count of the counter circuit is shown on axis k; the output of the associated comparator circuit is shown on axis R, directly expressed in meters.

Since at increasing distances of the obstacles from the antenna the echo signals become weaker and weaker, the amplifier circuits have a variable gain and the gain is increased by the counter circuit, the count signal of which thereby acting as a gain control signal.

The comparator circuits are per se known and commercially available. In addition to comparing the output signals of the amplifier circuits to the output signal of the counter circuit in order to obtain the R signal, such known comparator circuits are adapted to compare the output signals of said amplifier circuits to one another, so as to ascertain whether a certain echo signal is being received by antenna A or B or C or by more than one of the antennas A, B and C, according to the considerations already made in connection with FIG. 2, thereby furnishing a Z signal which contains the angular information relating to the obstacle.

As shown in FIG. 6, the three signals P.R.F., R and Z are applied to a logics and display circuitry in order to drive in per se known manner the array display device shown in FIG. 1.

An important requirement of the system is that it should not be affected by any noise caused by the vehicle itself. Therefore, for electromagnetic requirements, it is essentially important that the transmitted waveform be not amplitude modulated (by short pulses): it is to be frequency modulated. The main teaching of this invention is to use frequency pulse modulation and in particular to use resonant cavities. It is believed that this is a novel use of resonant cavities because they are usually intended to operate by continuous waves and are normally used in telecommunication systems or in Doppler radar systems.

In conclusion, the operation mode of this radar system is completely different with respect to all known radar systems. In fact, all existing radar systems emit high power radiofrequency pulses (generated by klystons, magnetrons, and like) alternated with dead periods during which the transmitter is off and the echo signals are received; in all existing radar systems use is made of floating antennas (that are bulky, delicate and unsightly) or of very expensive and scarcely directional phase-array antennas. The operative aspects of this invention which are believed to be novel and advantageous are as follows:

(a) continuous but frequency modulated waves are transmitted (with short $\tau$ duration bursts) by using simpler and more economic devices (resonant cavities) and high gain, highly directional, horn type or parabolic type fixed antennas; and (b) the "amplitude discrimination" technique is exploited, based upon n divergent and fixed beams for the angular information (Z) determination.

The system of this invention is different from the amplitude-comparison monopulse tracking radar, which employs overlapping antenna patterns to obtain the angular information. This system is not a radio-beacon since it is fully self-contained and does not require transponders mounted for instance on other vehicles. This system cannot be considered as a development of a radio altimeter based upon the Doppler effect, because the Doppler effect in no way is utilized in this invention; in fact, rather than a single measurement, such as the ground-aircraft distance, this system performs as many and distinct measurements as obstacles are in continuous movement in front of the vehicle (including their angular position Z), in order to achieve a complete map of the free space and of the occupied space in front of a vehicle, as shown in FIG. 1, left portion.

It should be understood that a preferred embodiment has been shown and described heretofore, but those skilled in the art can make changes and modification therein to adapt the system to any kind of land, sea or air vehicle without departing from the scope of this invention.

What is claimed is:

1. A vehicular anticollision radar system for driving in foggy condition having a bidimensional display device adapted for direct vision or for projecting an image of the space in front of the vehicle upon its windscreen, so as to furnish a symbolic representation of an obstacle with information as to its distance (R) and angular position (Z) with respect to the vehicle, characterized in that it comprises an oscillator circuit to generate a continuous square wave signal with a period $\tau$, connected to a modulator circuit, to a frequency divider circuit and to a counter circuit; said frequency divider circuit generating a square wave signal (P.R.F.) with a period T and being connected to said counter circuit and to said modulator circuit; said modulator circuit having a number n of output terminals and being adapted to generate a first voltage ($V_1$) responsive to said square wave signal from said oscillator circuit and a second voltage ($V_2$) responsive to said square wave frequency-divided signal from the frequency divider circuit; said modulator circuit being also adapted to normally furnish said first voltage ($V_1$) through said n output terminals and to successively furnish said second voltage ($V_2$) through said n output terminals in turn to n varactor diodes included in n resonant cavities each of which also includes a Gunn diode and a Schottky diode, respectively; said Gunn diodes generating a radiofrequency signal and being individually connected to n horn type or parabolic type fixed transmitting-receiving antennas; said Schottky diodes revealing echo signals received by said antennas and being connected to n variable gain amplifier circuits the outputs of which are individually connected to n comparator circuits to which also said counter is connected and wherein comparisons are made between the output signals of said amplifier circuits and the count signal (k) of said counter circuit so as to furnish a first signal (R) responsive to the time needed by a signal emitted from one of said antennas to reach an obstacle and to return upon reflection therefrom to one or more of said antennas and a second signal (Z) responsive to and representative of which of these antennas receive(s) an echo signal as well as a logic and display circuitry which is connected to said frequency divider circuit and to said comparator circuits so as to receive said P.R.F., R and Z signals in order to accordingly drive said bidimensional display device.

2. A vehicular anticollision radar system according to claim 1, characterized in that said bidimensional display device is a display dial consisting of an array or matrix of luminous spots or cells arranged in rows and columns and illuminated so as to indicate the distance and the angular position of any obstacle with respect to the vehicle.

3. A vehicular anticollision radar system according to claim 1, characterized in that said frequency divider circuit is also connected to said counter circuit so as to supply it with its output frequency-divided signal (P.R.F.) as a reset signal for the counter.

4. A vehicular anticollision radar system according to claim 1, characterized in that said counter circuit is also connected to said amplifier circuits so that its count output signal acts as a gain control signal for said amplifier circuits.

5. A vehicular anticollision radar system according to claim 1, wherein, in each of said resonant cavities, said Gunn diode generates an oscillating signal at a radiofrequency $f_1$ when said first voltage $V_1$ is applied to said varactor diode and at a radiofrequency $f_2$ when said second voltage $V_2$ is applied to said varactor diode, and wherein said Schottky diode generates a beat signal of said $f_1$ and $f_2$ frequency signals, characterized in that filter means are provided to filter-out any undesired component of said beat signal.

6. A vehicular anticollision radar system according to claim 2, further characterized in that said modulator circuit also includes means to distribute (multiplex) the $V_2$ voltage signal to the varactor diodes of said resonant cavities.

7. A vehicular anticollision radar system according to claim 5, characterized in that said filter means filter-out any component having a frequency ($f_1+f_2$).

* * * * *